US012676829B2

(12) United States Patent
Khasanova et al.

(10) Patent No.: US 12,676,829 B2
(45) Date of Patent: Jul. 7, 2026

(54) MACHINE LEARNING-BASED DNS REQUEST STRING REPRESENTATION WITH HASH REPLACEMENT

(71) Applicant: Oracle International Corporation, Redwood Shores, CA (US)

(72) Inventors: Renata Khasanova, Zurich (CH); Felix Schmidt, Baden-Dattwil (CH); Stuart Wray, Cambridge (GB); Craig Schelp, Vancouver (CA); Nipun Agarwal, Saratoga, CA (US); Matteo Casserini, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 234 days.

(21) Appl. No.: 18/237,853

(22) Filed: Aug. 24, 2023

(65) Prior Publication Data

US 2023/0421528 A1      Dec. 28, 2023

Related U.S. Application Data

(63) Continuation of application No. 17/197,375, filed on Mar. 10, 2021, now Pat. No. 11,784,964.

(51) Int. Cl.
H04L 61/4511 (2022.01)
G06F 40/30 (2020.01)
(Continued)

(52) U.S. Cl.
CPC .......... H04L 61/4511 (2022.05); G06N 20/00 (2019.01); H04L 41/16 (2013.01); G06F 40/30 (2020.01)

(58) Field of Classification Search
CPC . H04L 63/1425; H04L 61/4511; H04L 41/16; G06N 20/00
See application file for complete search history.

(56) References Cited

U.S. PATENT DOCUMENTS

2012/0254398 A1* 10/2012 Thomas .............. H04L 61/4511
                                                       709/224
2016/0065611 A1* 3/2016 Fakeri-Tabrizi .... H04L 63/1425
                                                         726/23
(Continued)

OTHER PUBLICATIONS

Vanitha, N., et al., "Malicious-URL Detection using Logistic Regression Technique", Intl Journ of Eng and Mgmt Research, vol. 9, Issue 6, https://doi.org/10.31033/ijemr.9.6.18, Dec. 2019, 6pgs.
(Continued)

*Primary Examiner* — Nam T Tran
(74) *Attorney, Agent, or Firm* — Hickman Becker Bingham Ledesma LLP

(57) ABSTRACT

Techniques are described herein for using machine learning to learn vector representations of DNS requests such that the resulting embeddings represent the semantics of the DNS requests as a whole. Techniques described herein perform pre-processing of tokenized DNS request strings in which hashes, which are long and relatively random strings of characters, are detected in DNS request strings and each detected hash token is replaced with a placeholder token. A vectorizing ML model is trained using the pre-processed training dataset in which hash tokens have been replaced. Embeddings for the DNS tokens are derived from an intermediate layer of the vectorizing ML model. The encoding application creates final vector representations for each DNS request string by generating a weighted summation of the embeddings of all of the tokens in the DNS request string. Because of hash replacement, the resulting DNS request embeddings reflect semantics of the hashes as a group.

21 Claims, 4 Drawing Sheets

200

202 TOKENIZE THE PLURALITY OF DNS REQUEST STRINGS, IN THE TRAINING DATASET, TO PRODUCE A CORRESPONDING PLURALITY OF TOKENIZED DNS STRINGS

204 FOR EACH TOKENIZED DNS STRING OF ONE OR MORE TOKENIZED DNS STRINGS, FROM THE PLURALITY OF TOKENIZED DNS STRINGS: IDENTIFY A HASH TOKEN, IN SAID EACH TOKENIZED DNS STRING BASED, AT LEAST IN PART, ON A LENGTH OF THE HASH TOKEN AND A NUMBER OF UNIQUE CHARACTERS IN THE HASH TOKEN, AND REPLACE THE IDENTIFIED HASH TOKEN WITH A PARTICULAR PLACEHOLDER TOKEN

206 TRAIN A VECTORIZING ML MODEL BASED, AT LEAST IN PART, ON THE PRE-PROCESSED TRAINING DATASET TO PRODUCE A TRAINED VECTORIZING ML MODEL

208 GENERATE VECTOR REPRESENTATIONS OF THE PLURALITY OF DNS REQUEST STRINGS BASED, AT LEAST IN PART, ON DNS TOKEN EMBEDDINGS IN AN INTERMEDIATE LAYER OF THE TRAINED VECTORIZING ML MODEL

(51) Int. Cl.
  G06N 20/00      (2019.01)
  H04L 41/16      (2022.01)

(56)                    References Cited

U.S. PATENT DOCUMENTS

2018/0227321 A1*   8/2018  Freund .............. H04L 61/4511
2018/0351976 A1*  12/2018  Shitrit-Efergan  ... H04L 63/1425
2020/0195669 A1*   6/2020  Karasaridis ......... H04L 63/1425
2021/0026978 A1*   1/2021  Poothokaran ........ H04L 67/535
2022/0210170 A1*   6/2022  Di Pinto ............. H04L 63/1425

OTHER PUBLICATIONS

Sahoo, Doyen, et al., "Malicious URL Detection using Machine Learning: a Survey", ACM, vol. 1, No. 1, Aug. 2019, 37pgs.
Le, Franck, et al., "Unearthing and Exploiting Latent Semantics behind DNS Domains for Deep Network Traffic Analysis", In IJCAI Workshop on AI for Internet of Things, Aug. 12, 2019, 6pgs.
Bilge, Leyla, et al., "EXPOSURE: Finding Malicious Domains Using Passive DNS Analysis", In Proceedings of the Ntwk and Distributed Sys Sec Symp 2011, Jan. 2011, 17pgs.
Arora, Amit, et al., "Dns2vec: Exploring Internet Domain Names Through Deep Learning", SCAINET 2019, Santa Clara, CA, https://www.usenix.org/conference/scainet19/presentation/arora , Aug. 12, 2019, 21pgs.
Antonakakis, Manos, et al., "From Throw-Away Traffic to Bots: Detecting the Rise of DGA-Based Malware", presented at the 21st USENIX Security Symp, pp. 491-506, Aug. 8, 2012, 16pgs.

* cited by examiner

Figure 2:
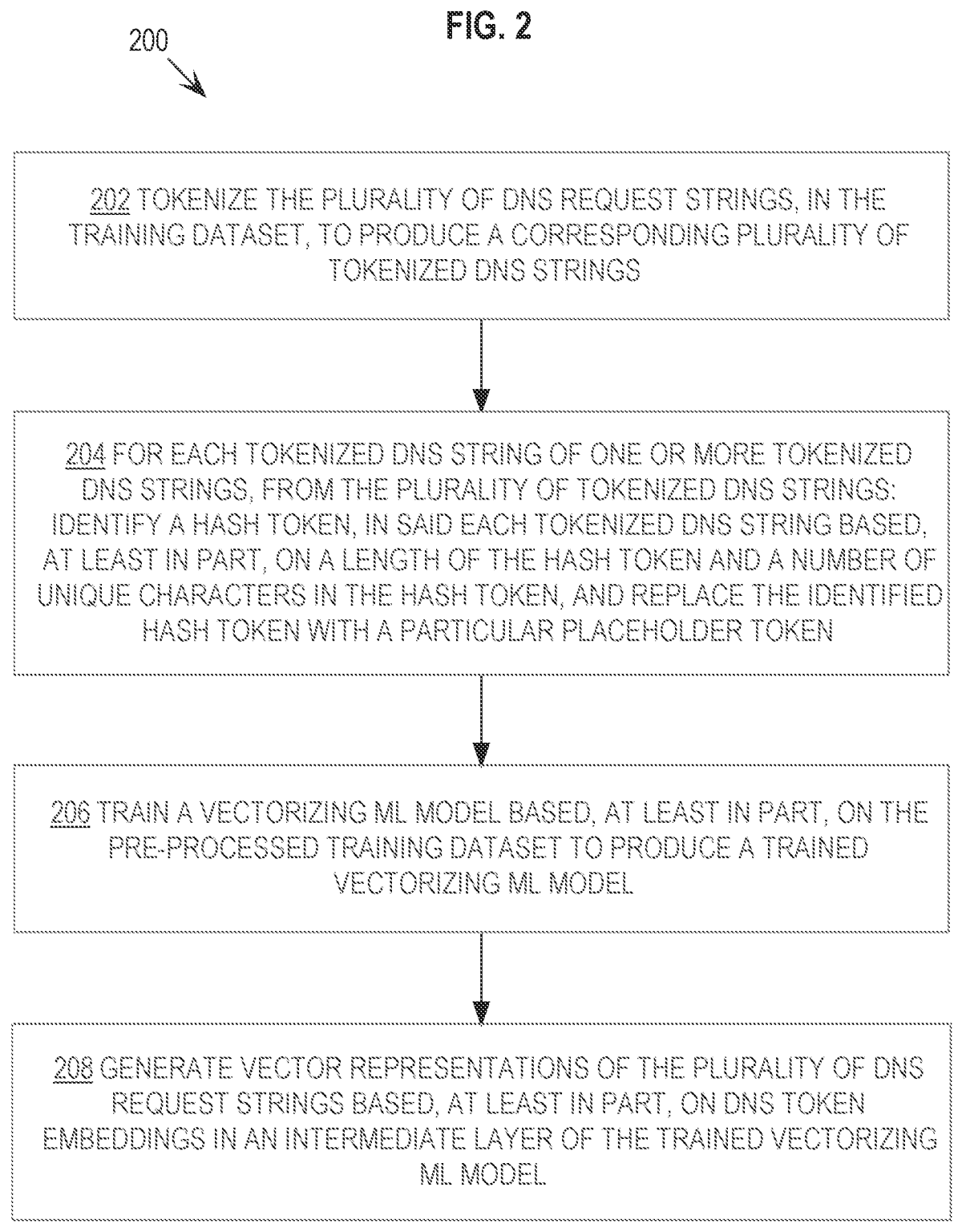

202 TOKENIZE THE PLURALITY OF DNS REQUEST STRINGS, IN THE TRAINING DATASET, TO PRODUCE A CORRESPONDING PLURALITY OF TOKENIZED DNS STRINGS

204 FOR EACH TOKENIZED DNS STRING OF ONE OR MORE TOKENIZED DNS STRINGS, FROM THE PLURALITY OF TOKENIZED DNS STRINGS: IDENTIFY A HASH TOKEN, IN SAID EACH TOKENIZED DNS STRING BASED, AT LEAST IN PART, ON A LENGTH OF THE HASH TOKEN AND A NUMBER OF UNIQUE CHARACTERS IN THE HASH TOKEN, AND REPLACE THE IDENTIFIED HASH TOKEN WITH A PARTICULAR PLACEHOLDER TOKEN

206 TRAIN A VECTORIZING ML MODEL BASED, AT LEAST IN PART, ON THE PRE-PROCESSED TRAINING DATASET TO PRODUCE A TRAINED VECTORIZING ML MODEL

208 GENERATE VECTOR REPRESENTATIONS OF THE PLURALITY OF DNS REQUEST STRINGS BASED, AT LEAST IN PART, ON DNS TOKEN EMBEDDINGS IN AN INTERMEDIATE LAYER OF THE TRAINED VECTORIZING ML MODEL

Figure 4:
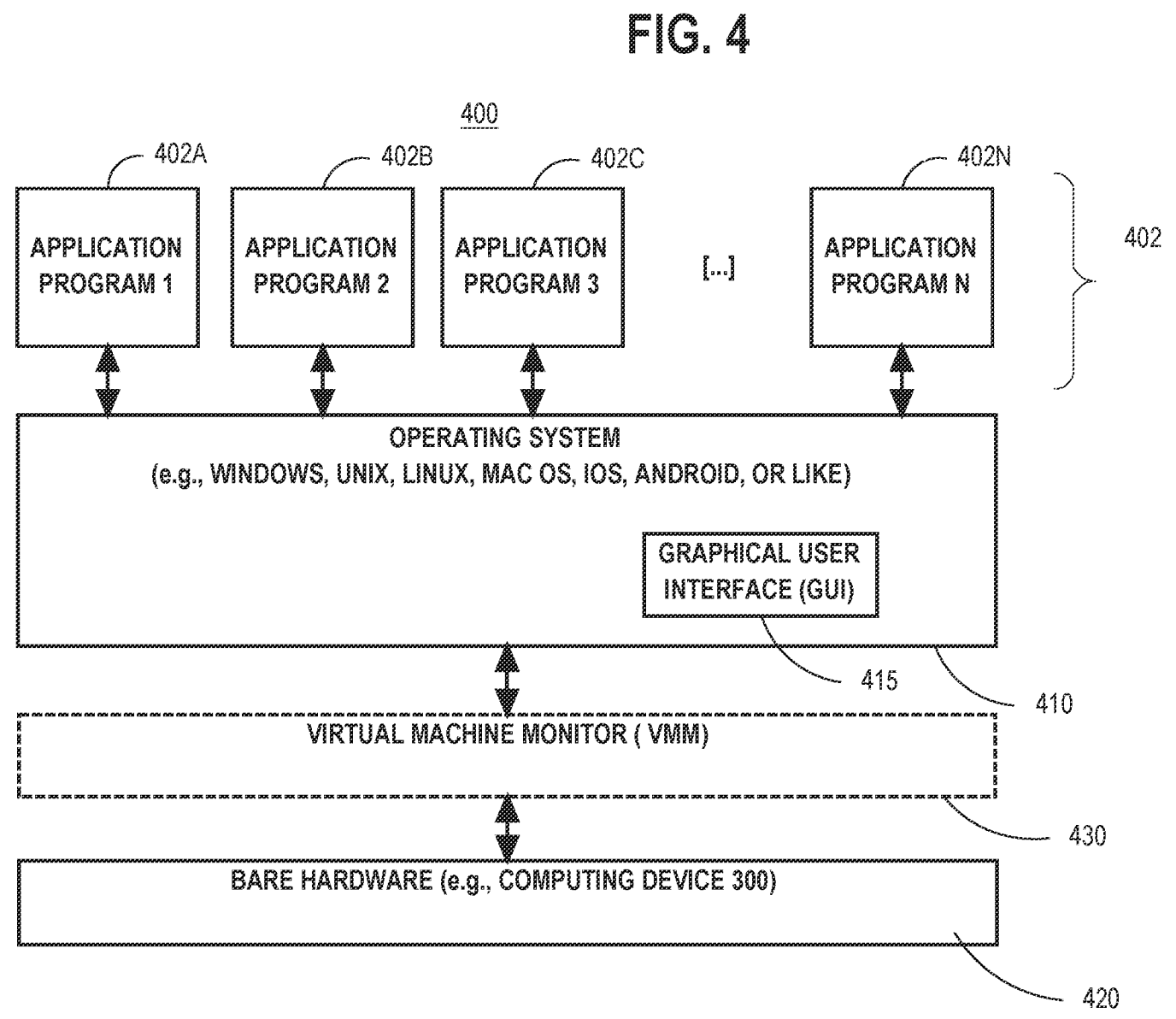

402 {
402A — APPLICATION PROGRAM 1
402B — APPLICATION PROGRAM 2
402C — APPLICATION PROGRAM 3
[...]
402N — APPLICATION PROGRAM N
}

OPERATING SYSTEM
(e.g., WINDOWS, UNIX, LINUX, MAC OS, IOS, ANDROID, OR LIKE)

GRAPHICAL USER INTERFACE (GUI)    415

410

VIRTUAL MACHINE MONITOR (VMM)    430

BARE HARDWARE (e.g., COMPUTING DEVICE 300)    420

MACHINE LEARNING-BASED DNS REQUEST STRING REPRESENTATION WITH HASH REPLACEMENT

BENEFIT CLAIM

This application claims the benefit as a continuation of application Ser. No. 17/197,375, filed Mar. 10, 2021, by Renata Khasanova et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present invention relates to machine learning for DNS requests and, more specifically, to machine-learning embeddings for DNS requests that represent semantics of the DNS requests.

BACKGROUND

Web browsers allow users to access computers, services, or other resources connected to the Internet or a private network. Such resources are identified using Internet Protocol (IP) addresses, which consist of series of numbers that are difficult for humans to memorize. Accordingly, Domain Name System (DNS) is a naming system that maps IP addresses to word-based domain names, which are much more easily memorized. DNS protocol is simple and DNS requests generally move unencrypted through the network. Thus, DNS logs may be maintained to record information— which may include a request timestamp, client IP address, DNS request string, type of DNS request, etc.—for individual DNS requests seen at a given point in the network, such as DNS requests seen at a company firewall.

Analysis of DNS logs can reveal trends in user activities, such as conformance to workplace norms or regulations, frequency of requests for particular domains, etc. DNS requests can also be used to perform malicious attacks. For example, malicious actors may use DNS requests to send encoded and potentially dangerous information outside of a firewall (an "exfiltration" attack), or to overwhelm computing devices serving data for a particular domain (a "DNS flood" attack), etc. Accordingly, analysis of DNS logs can also reveal the presence of malicious DNS requests.

DNS logs are generally very large, it is not feasible to process them manually to identify trends or potentially malicious requests. It is possible to analyze DNS logs using standard rule-based techniques, but these techniques must be explicitly updated to track new types of malicious attacks and do not catch attack types that are not generally known. Furthermore, detection of exfiltration attacks (which cause DNS requests to include long and seemingly random strings of characters) can be difficult because not all seemingly random strings in DNS requests are malicious. For example, some data encoded in DNS requests have legitimate uses, and some seemingly random strings may actually be random. Thus, rule-based techniques for DNS request analysis are generally insufficient to identify trends in DNS requests involving these seemingly random strings. Also, it can be difficult to use such rule-based systems to detect complex attack patterns given the difficulty in describing such attacks using a set of rules.

Machine learning (ML)-based solutions are also used to perform DNS data analysis. ML models use numerical encodings of input data. Thus, in order for ML-based DNS data analysis to analyze DNS logs, textual information from the DNS request strings is converted to numerical representations. A common way to create numerical representations of textual data is to use the one hot encoding (OHE) strategy, which encodes each unique string using a binary number with all '0' bits and only one '1' bit. However, the length of OHE-based numerical representations depends on the number of distinct strings that are being encoded. The presence of seemingly random strings within a given DNS log can greatly increase the variety of distinct DNS request strings in the set of data being encoded, which can make the OHE-based encodings extremely long. Also, such representations do not encode any semantics of the DNS requests, which limits the utility of the resulting encodings.

Machine learning-based feature extraction or representation learning may be applied to raw DNS data in order to convert the textual data to numerical form. In order to apply these techniques to DNS request encodings, features for a set of DNS requests are typically extracted, by hand, directly from the corpus of DNS requests. For example, one such technique calculates features for a DNS corpus based on time (such as daily similarities, repeating patterns), DNS reply-based features (such as number of distinct IP addresses, number of distinct countries), TTL (such as average value, its standard deviation, number of distinct values), and DNS name (such as percentage of numerical characters). Another such technique extracts, as features of a DNS corpus, statistical characteristics of domain names, such as request length, level of "randomness", character frequency distribution, etc. The main limitation of these techniques is that their capabilities are limited due to hand-crafted feature design. Consequently, they cannot flexibly adapt to a task at hand, and can miss many kinds of malicious data (especially little-known types of malicious data). Another drawback is that an attacker could find a way to fool defense systems based on knowledge of the hand-crafted features.

It has been suggested to machine-learn vector representations of top-level domains (e.g., "oracle.com") based on sequences of top-level domains from DNS requests that are queried by the same source IP address during a given time interval. See, e.g., the following sequence of j top level domains from an $i^{th}$ source IP address during an $i^{th}$ time interval $(IP_i, t_i)$: top $DNS_{i0}$, top $DNS_{i1}$, . . . , top $DNS_{ij}$. This proposed technique processes each top-level domain of the DNS requests as individual words and applies a Word2Vec algorithm to learn the numerical representation of each domain. Another similar proposal indicates that semantically similar DNS requests usually are queried by the same device, with requests that are close in time. Thus, this proposal suggests building feature vectors for DNS requests based on such concurrent information. However, encodings resulting from these techniques would likely miss similarities between DNS requests that are outside of the indicated areas of focus, which may cause these systems to miss certain kinds of attacks, including exfiltration attacks.

Thus, it would be beneficial to use ML-based encoding techniques that are capable of encoding DNS requests, using a relatively compact vector space, in a way that represents the semantics of the DNS requests as a whole.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for using machine learning to produce vector representations for a plurality of DNS requests based on hash replacement.

FIG. 3 is a block diagram that illustrates a computer system upon which an embodiment may be implemented.

FIG. 4 is a block diagram of a basic software system that may be employed for controlling the operation of a computer system.

DETAILED DESCRIPTION

Figure 1:
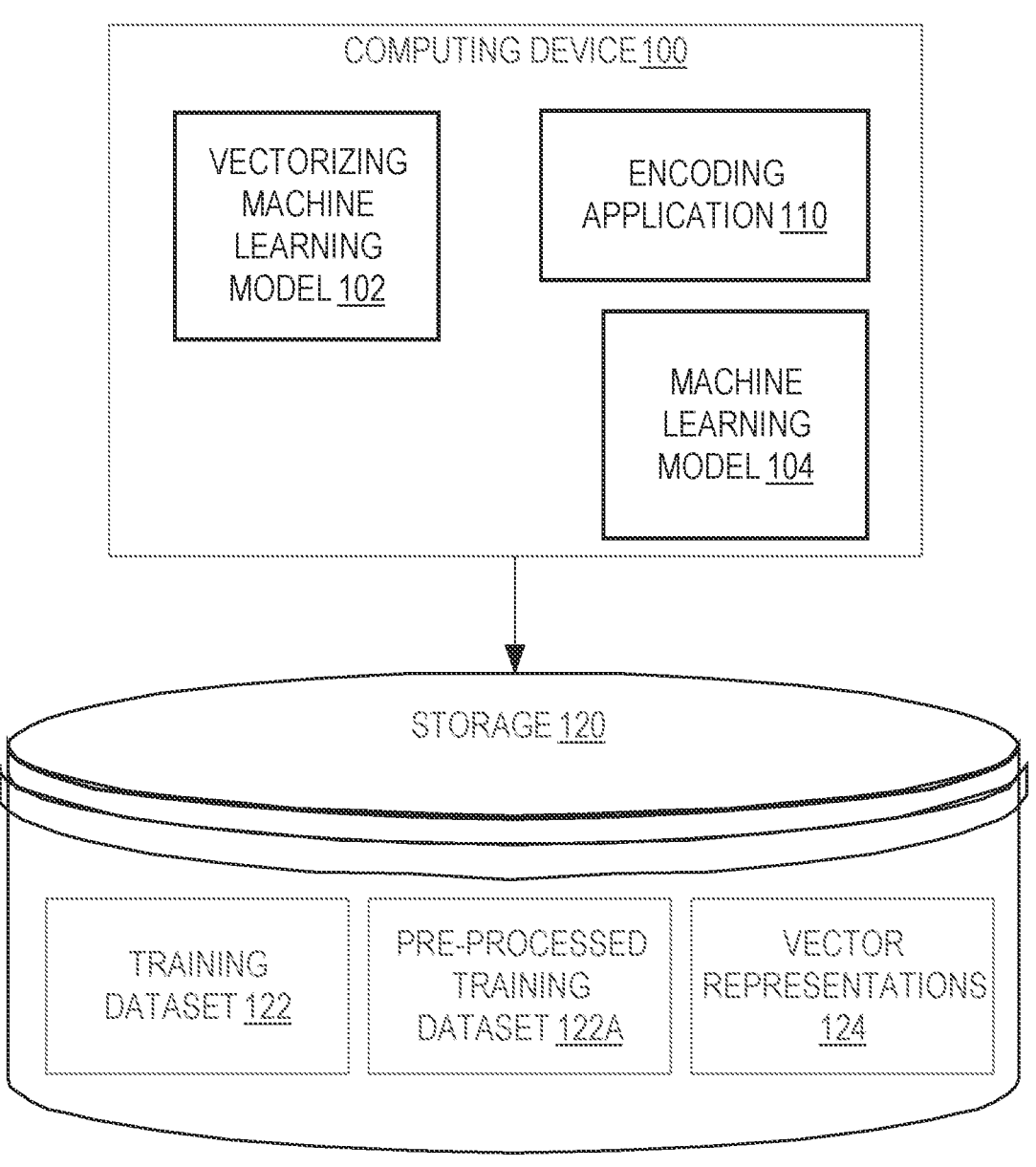
FIG. 1 depicts a block diagram of an example computing device that is configured with an encoding application.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for using machine learning to learn vector representations of DNS requests such that the resulting embeddings represent the semantics of the DNS requests as a whole. These techniques apply NLP-based machine learning techniques, which use a vectorizing ML model to learn embeddings for natural language text, to entire DNS request strings to learn vector representations of the requests. According to an embodiment, the Word2Vec vectorizing algorithm is used to generate embeddings for DNS requests. The Word2Vec algorithm is a highly efficient and effective method for generating embeddings, for natural language words, that represent semantics of the words.

Specifically, according to an embodiment, a computer-executed DNS encoding application tokenizes DNS request strings and trains a vectorizing ML model on a training dataset of the tokenized DNS request strings to learn embeddings for the tokens. Hash tokens, which are long and seemingly random strings of characters in DNS requests, that occur in a training dataset used to train the vectorizing ML model increase the variance of the vocabulary being learned by the model. Hash tokens are very rarely repeated and do not, individually, have semantics in the original feature space. However, trends in the occurrence of hash tokens, as a group, can be valuable to represent in embeddings of DNS requests. Training the vectorizing ML model on a training dataset that includes hash tokens increases the complexity of the learning task and prevents detection of semantics of hash tokens as a whole.

To reduce the complexity of the task of learning embeddings for DNS request strings, and to allow embeddings of the requests to reflect the semantics of hash tokens as a whole, techniques described herein perform pre-processing of DNS request strings in which hash tokens are detected in DNS request strings and each detected hash token is replaced with a placeholder token. The vectorizing ML model is then trained using the pre-processed training dataset in which hash tokens have been replaced. Embeddings for the DNS tokens are derived from an intermediate layer of the vectorizing ML model. The encoding application creates final vector representations for each DNS request string by generating a weighted summation of the embeddings of all of the tokens in the DNS request string.

Accordingly, the features of the DNS requests are learned end-to-end from DNS request data, and each DNS request is processed individually based on the entirety of the DNS request string to create a vector representation that represents the semantics of the DNS request in the original feature space. This allows the encoding application described herein to not lose any important information, which full DNS request strings could contain. Hash token replacement simplifies the data representation learning task and allows processing of DNS request data without losing/allowing to be obscured potentially important information regarding hash tokens as a group. Furthermore, learning DNS request embeddings based on pre-processed DNS request strings significantly reduces memory usage of the ML model because of the reduced variance in the DNS token vocabulary, which facilitates processing of large collections of DNS request data.

Replacement of hash tokens with the placeholder token reduces processing time for the vectorizing ML model because the model does not attempt to identify semantics for hash tokens, which do not have semantics in the original feature space. Furthermore, replacement of hash tokens in training data significantly reduces the time needed to train an embedding model, which reduces the resources required to train the model and the cost associated with training the model. The reduced resources required to train the model further increases the scalability of the system. This is important because training on more data could potentially lead to models that are more effective, e.g., in detecting potential threats.

The resulting vector representations of DNS requests are compact, when compared to the original DNS requests strings, and may be efficiently used in virtually any type of network behavior analysis, such as classification of the requests (e.g., malicious/non-malicious), anomaly detection, clustering, etc. Because of the compact representations, ML models that are trained based on these vector representations require fewer computing resources to be trained, require less memory, and are smaller and more efficiently-executed ML models.

Security applications may use the DNS request embeddings to enhance DNS-based computer security. The embeddings allow downstream applications to group similar DNS requests together, which can help security experts to find potentially malicious examples and further analyze the data. Thus, the DNS request embeddings, which encode semantics of the DNS requests, potentially allow identification of new types of suspicious activities in the network and/or improvement of the speed of analysis for security experts. Determining Embeddings that Represent Token Semantics in the Original Feature Space As indicated above, it can be very useful for vector representations (or "embeddings") of data, for use by an ML model, to represent semantics of the data in the original feature space. The better that vector representations represent the semantics of the data in the original feature space, the more useful the vector representations are for downstream applications. Thus, "vectorizing" ML models have been developed to learn embeddings for text data that represent the semantics of the data within the original feature space.

Word2Vec is an example vectorizing ML model algorithm for learning embeddings for natural language words, where the resulting embeddings represent the semantic distances between the words in the original feature space. (For additional information regarding Word2Vec, see Mikolov, Tomas et al. "Distributed Representations of Words and Phrases and their Compositionality." *Advances in neural information processing systems* (2013), and Mikolov, Tomas et al. "Efficient Estimation of Word Representations in Vector Space." *ICLR* (2013), each of which is incorporated by reference as if fully set forth herein.)

When embeddings of natural language words represent semantics of the original language, the semantic distances between words within the natural language feature space are represented by the vector representations in the vector space. For example, in English, the semantic distance between the word "king" and the word "queen" is the same as the semantic distance between the word "man" and the word "woman" in the original natural language feature space. Thus, when configured to represent semantic distances between words, embeddings of the word "king" and the word "queen" are the same distance apart, in the vector space, as embeddings that represent the word "man" and the word "woman".

To illustrate application of the Word2Vec algorithm, an example Word2Vec neural network ML model is described, which is configured to learn numerical representations $r(w_i)$ of textual data that consists of a collection of words $w_i$. When trained, this Word2Vec ML model associates each word from the textual data with a vector, where the plurality of resulting vectors is optimized in such a way that the similarity metric between the vectors indicates the level of similarity between the words represented by those vectors $r(w_i)$. In other words, the resulting vector representations reflect the semantics of the words in the original feature space.

An example training data set for the Word2Vec ML model includes a large set of natural language sentences (e.g., in English). Each sentence is parsed into words based on punctuation and whitespace. According to an embodiment, in order to learn vector representations of the natural language words, the Word2Vec ML model is trained to predict a missing word from a sentence given a context of the missing word, e.g., a number of preceding words and a number of following words of the missing word. Once the Word2Vec ML model is trained, an intermediate layer of the neural network includes embeddings for the words over which the model was trained. These embeddings represent the semantic distances between the words in the original feature space.

For example, the following is a target natural language sentence for training the Word2Vec ML model: "I ate a sandwich for dinner." The word "sandwich" is masked out of the target sentence, and the Word2Vec ML model is trained to predict the word "sandwich" given the context: "ate a _____ for dinner". As the model learns the task, the model might make a mistake and predict the word "pizza" as the word that belongs in the target sentence. This mistake is reasonable because the words "sandwich" and the word "pizza" are semantically close in meaning. Such a mistake indicates that the model has learned to put the embeddings of these two words close together in the vector space, which minimizes the error of the word prediction task.

According to an embodiment, in order to learn vector representations of the natural language words, the Word2Vec ML model is trained to predict the context for a given word. For example, the ML model is trained to predict the context "ate a _____ for dinner" given the word "sandwich".

Pre-Processing the Dataset

According to embodiments, a vectorizing ML model, e.g., implementing the Word2Vec algorithm, is used to determine embeddings for DNS requests that represent semantics of the DNS requests in the original feature space. DNS encodings that reflect request semantics increase the usefulness of the encodings over other encodings, such as OHE, that simply assign numbers to the different DNS request strings.

Examples of determining embeddings for DNS requests are described herein in connection with a computing device 100 depicted in FIG. 1. Specifically, FIG. 1 depicts a block diagram of an example computing device 100 that is configured with a vectorizing ML model 102. Computing device 100 also runs an encoding application 110 that encodes DNS request strings into vector representations according to techniques described herein. While encoding application 110 is depicted as a stand-alone application, encoding application 110 (and the techniques attributed thereto) may be integrated into any other application, such as an ML-based DNS analysis application (as described in further detail below). Computing device 100 is communicatively connected to persistent storage 120, which includes at least a training dataset 122 comprising a plurality of data instances. Embodiments are not limited to the system configuration depicted in FIG. 1.

According to an embodiment, vectorizing ML model 102 is used to learn embeddings of tokens of DNS request strings, which are used to generate vector representations of the DNS requests that reflect the semantics of the requests. The semantics of DNS requests are relative similarities between the requests. For example, two DNS requests that have similar attributes (such as being from the same domain, having a number of tokens in common) are semantically close in the DNS request space based on the similar attributes.

Vectorizing ML model 102 is trained using training dataset 122 with DNS tokens acting as "words" for the vectorizing algorithm, and DNS request strings acting as "sentences". To illustrate, training dataset 122 is an example DNS log that records the following information for each DNS request of a plurality of DNS requests: a DNS request string, a request timestamp, and a source IP address. Each DNS request string comprises DNS tokens, which are delineated by period characters ('.'). For example, the DNS request string "abc.def.oracle.com" includes the DNS tokens: "abc", "def", "oracle", and "com".

Before the vectorizing ML model 102 is trained to produce the embeddings needed to generate DNS request vector encodings, training dataset 122 is preprocessed to reduce the variance in the DNS requests. Specifically, because DNS request strings are not natural language, some DNS requests include tokens (referred to herein as "hash" tokens) that are long random-seeming strings of data that may represent encoded data included in the DNS requests. Many times, a hash token in a DNS request string encodes exfiltrated information that is communicated via the DNS request. There are some legitimate uses of exfiltration via hash tokens, and there are malicious uses of hash tokens including exfiltration attacks.

Because hash tokens are composed of random-seeming characters, each hash token is very different from each other. These hash tokens do not have semantics individually, as it is unlikely to see the same hash token more than once in a given dataset. Given DNS request strings with hash DNS tokens in training dataset 122, vectorizing ML model 102 treats each hash token as unique, creating a distinct embedding for each. Specifically, at the beginning of training a vectorizing ML model, each unique "word" in the training dataset is encoded individually, e.g., using OHE. The presence of hash tokens in the DNS request dataset makes the vector space of the resulting vector encodings extremely large. Also, the vectorizing ML model would attempt to determine the semantics of the hash tokens, even though hash tokens do not have semantics in the original feature space, which increases the cost of training the model.

On the other hand, it is generally beneficial to identify trends in hash tokens in a set of DNS requests rather than treating each hash token as an individual "word" for the vectorizing algorithm. Because hash tokens are random-seeming strings of characters, the actual composition of these tokens is not as important as the fact that they are seemingly random. As such, according to an embodiment, encoding application 110 pre-processes dataset 122 to replace hash DNS tokens, in the dataset, with a placeholder token to produce pre-processed training dataset 122A. Vectorizing ML model 102 is trained on pre-processed training dataset 122A.

FIG. 2 depicts a flowchart 200 for using machine learning to produce vector representations for a plurality of DNS request strings based on hash replacement. Specifically, at steps 202 and 204 of flowchart 200, a training dataset that comprises a plurality of DNS request strings is pre-processed to produce a pre-processed training dataset. Specifically, at step 202, a plurality of DNS request strings, in a training dataset, is tokenized to produce a corresponding plurality of tokenized DNS strings. For example, encoding application 110 tokenizes, according to period character delineations, the DNS request strings in training dataset 122 to produce a pre-processed training dataset 122A. Pre-processed training dataset 122A comprises a plurality of tokenized DNS request strings corresponding to the plurality of DNS request strings of dataset 122.

Replacing Hash Tokens with a Placeholder Token in DNS Request Strings

At step 204 of flowchart 200, for each tokenized DNS string of one or more tokenized DNS strings, from the plurality of tokenized DNS strings: a hash token is identified in said each tokenized DNS string based, at least in part, on a length of the hash token and a number of unique characters in the hash token, and the identified hash token is replaced with a particular placeholder token. For example, encoding application 110 identifies one or more hash tokens among the tokenized DNS strings in pre-processed training dataset 122A. To identify hash tokens, encoding application 110 calculates an entropy metric (E(w)) for each token w in training dataset 122A according to the following Formula 1:

$$E(w)=\log_2(U(w))l(w), \qquad \text{(Formula 1)}$$

where U(w) is a number of unique characters in token w, and l(w) is a length of the token. This metric will be high for long words with a high variability of letters, as is generally found for hash tokens that encode data. The intuition for using the entropy metric identified by Formula 1 is that conventional DNS tokens will generally have a shorter length than hash tokens, and also generally have more repetitive patterns of characters.

To illustrate, training dataset 122A includes a DNS request string "ooekk4mfiidkf455k1e0mjdkk5ioeuij.oracle.com". This DNS request string includes the token "ooekk4mfiidkf455k1e0mjdkk5ioeuij". Encoding application 110 calculates the entropy metric E(w) for this token as follows, where U(w)=13 and l(w)=32: E(w)=$\log_2$(13)× 32=118.41 (rounded to the nearest hundredths place). Encoding application 110 calculates the entropy metric E(w) for the token "oracle" as follows, where U(w)=6 and l(w)=6: E(w)=$\log_2$(6)×6=15.51. Encoding application 110 calculates the entropy metric E(w) for the token "com" as follows, where U(w)=3 and l(w)=3: E(w)=$\log_2$(3)×3=4.75.

According to an embodiment, encoding application 110 identifies, as hash tokens, any token in training dataset 122A whose entropy metric exceeds an entropy threshold E. According to an embodiment, the entropy threshold E is determined one time and is used to train multiple subsequent datasets.

According to an embodiment, the entropy threshold is determined based on analysis of an unlabeled dataset, e.g., training dataset 122A. For example, encoding application 110 calculates the entropy metric (E(w)) of each token in dataset 122A to identify a distribution (or "histogram") of the entropy metric values. Based on the histogram, encoding application 110 uses statistical methods to determine an entropy threshold E that maximizes the separation between the groups of tokens below the identified threshold and above the identified threshold. The separation could be measured, for instance, by taking the difference between the average metric value below the threshold and the average metric value above the threshold.

According to another embodiment, the entropy threshold is determined based on analysis of a labeled dataset with known hash and non-hash tokens. For example, this labeled dataset may the original training dataset 122A after identifying hashes via some method other than using the entropy threshold, or a synthetic dataset created by the union of natural language words and random strings that are created programmatically, etc. Encoding application 110 computes the entropy metric E(w) for each token in this labeled dataset. Given an entropy threshold E, the tokens with entropy metrics above the threshold are predicted as "hash" and those below as "non-hash". Encoding application 110 thus calibrates the entropy threshold to maximize the number of hash/non-hash tokens that are correctly predicted.

According to another embodiment, encoding application 110 learns the entropy threshold based on an ML model that uses training dataset 122A (or other training dataset including hash tokens and non-hash tokens) to learn the entropy threshold.

If E<E(w) for a given token w, then encoding application 110 replaces the token, within the DNS request string that contains the identified hash token, with a placeholder token such as "<HASH>", which would not collide with a naturally occurring DNS token, e.g., "hash". Continuing with the previous example DNS request string "ooekk4mfiidkf455k1e0mjdkk5ioeuij.oracle.com", encoding application 110 determines that the token "ooekk4mfiidkf455k1e0mjdkk5ioeuij", with an entropy metric of 118.41, exceeds an example identified entropy threshold of 50, while the entropy metrics of the other tokens in the DNS request string do not exceed the threshold. Thus, encoding application 110 replaces the identified hash token in the DNS request string, in pre-processed training dataset 122A, as follows: "<HASH>.oracle.com".

Vectorizing ML Model

At step 206 of flowchart 200, a vectorizing ML model is trained based, at least in part, on the pre-processed training dataset to produce a trained vectorizing ML model. For example, encoding application 110 trains vectorizing ML model 102 based on pre-processed training dataset 122A. According to an embodiment, vectorizing ML model 102 is a neural network-type ML model that implements the Word2Vec algorithm described above.

To illustrate step 206, encoding application 110 identifies the following target DNS request string from pre-processed training dataset 122A: "<HASH>.oracle.com". The DNS token "com" is masked out of the target DNS request string, and vectorizing ML model 102 is trained to predict the DNS token "com" given the context: "<HASH>.oracle._____". As vectorizing ML model 102 learns the task, the model might make a mistake and predict the DNS token "org" as the DNS token that belongs in the target DNS request string. This mistake is reasonable because the DNS tokens "com" and "org" are semantically close in meaning. Such a mistake indicates that model 102 has learned to put the embeddings of these two DNS tokens close together in the vector space, which minimizes the error of the DNS token prediction task.

DNS Representation

At step 208 of flowchart 200, vector representations of the plurality of DNS request strings are generated based, at least in part, on DNS token embeddings in an intermediate layer of the trained vectorizing ML model. Specifically, after vectorizing ML model 102 is trained, an intermediate layer of the neural network includes embeddings of the DNS tokens that reflect the semantics of the tokens in the original feature space. Neural network vectorizing ML model 102 has at least three ordered layers: an input layer, an intermediate layer, and an output layer. Each layer processes input data, producing an output that is then input to the subsequent layer. When training the model on the data corpus, model 102 learns the proxy task by learning the weights to control the processing between each pair of layers (in this example model configuration: input to intermediate, and intermediate to output).

After model 102 learns the proxy task, the numeric representation in the intermediate layer of the model captures the semantics of the training data because putting similar words/tokens close together is a very efficient way to minimize the error of the proxy task. Thus, by dropping the final (output) layer of trained model 102, the output of the intermediate layer of model 102 for the different words/tokens are the embeddings that were learned for the words/tokens.

To illustrate step 208, encoding application 110 combines the embeddings, derived from the intermediate layer of trained vectorizing ML model 102, for each DNS token of a DNS request to create a global vector representation for the request according to Formula 2 as follows:

$$r(d_j) = \sum_{i=0}^{L-1} \alpha_i r(w_i), \qquad \text{(Formula 2)}$$

where L is a number of tokens in DNS request string $d_j$, $\alpha_i$ is a weighted sum multiplier, and r represents an embedding.

According to an embodiment, the a, parameter for each token is chosen based on a TF-IDF metric for the token. (For additional information regarding TF-IDF, see Salton, Gerard et al. "Term-weighting approaches in automatic text retrieval." *Information processing & management* (1988), which is incorporated by reference as if fully set forth herein.) TF-IDF is a measure of how unique a word/token is within a set of "documents" (or in this case, DNS request strings). According to an embodiment, TF-IDF score ($tfidf_{w_i}$) for a given token ($w_i$) is calculated according to Formula 3 below:

$$tfidf_{w_i} = f_{w_i, d_j} \log \left( \frac{J}{n_{w_i}} \right), \qquad \text{(Formula 3)}$$

where $f_{w_i, d_j}$ represents the frequency of token $w_i$ within the DNS request string $d_j$, J is the total number of DNS request strings in the corpus, and $n_{w_i}$ is the number of DNS request strings that contain token $w_i$. According to an embodiment, the term frequency is boolean (i.e., is set to 1 if the term is included in a target DNS request). The term frequency may also be a raw count, a frequency adjusted for DNS request string length, a logarithmically scaled frequency, or an augmented frequency that prevents bias toward longer DNS strings, etc.

Thus, if the token is very common and appears in many DNS request strings, $tfidf_{w_i}$ will approach 0. Further, the rarer a token is across DNS strings, the higher $tfidf_{w_i}$ for the token will be. According to an embodiment, $$\alpha_i = tfidf_{w_i} \Big/ \sum_{m=0}^{L-1} tfidf_{w_m}.$$

Thus, very frequent tokens are weighted close to 0 and rare tokens are heavily weighted to have a large influence on the final representation of the DNS request string.

To illustrate, there are 10,000 DNS request strings in training dataset 122A. The token "<HASH>" appears in 25 of the DNS request strings, the token "oracle" appears in 1,000 of the DNS request strings, and the token "com" appears in 6,500 of the DNS request strings. Thus, the TF-IDF scores for the different tokens in the DNS request string "<HASH>.oracle.com" is $$1 \times \log \left( \frac{10,000}{25} \right) = 2.602 \text{ for "<HASH>", } 1 \times \log \left( \frac{10,000}{1,000} \right) = 1$$

for "oracle", and $$1 \times \log \left( \frac{10,000}{6,500} \right) = 0.187$$

for "com". Thus, the weights for these tokens are as follows:

$\alpha_0$(<HASH>)=2.602/(2.602+1+0.187)=0.687, $\alpha_1$("oracle")=1/(2.602+1+0.187)=0.264, and $\alpha_2$("com")=0.187/(2.602+1+0.187)=0.049.

As shown below, the embedding for "<HASH>" is more influential in the vector representation of the DNS request than either of the other tokens.

To illustrate application of Formula 2 in the context of the above example, example embeddings for <HASH>, "oracle" and "corn", which would be obtained from trained model 102, are as follows:

$r$(<HASH>)=[1.2,3,4,1], $r$("oracle")=[2,3,7,5.5], and $r(\text{"com"})=[-0.5,2,-1,0.1]$.

Thus, for Formula 2: $r(\text{"<HASH>.oracle.com"})=0.687([1.2, 3, 4, 1])+0.264([2, 3, 7, 5.5])+0.049([-0.5, 2, -1, 0.1])$.

According to an embodiment, the vector representations of the plurality of DNS request strings are stored in memory. For example, encoding application 110 stores the vector representations generated according to techniques described above memory accessible by computing device 100. To illustrate, encoding application 110 stores vector representations 124, generated based on trained vectorizing ML model 102 as described in detail above, in storage 120.

Using the Vector Representations of the DNS Request Strings

Because the vector representations generated according to techniques described herein reflect semantics of the DNS requests in the original feature space, these embeddings may be used in a wide range of applications. For example, training dataset 122 is labeled to indicate DNS requests that are malicious exfiltration attacks, and ML model 104 is configured to detect potentially malicious exfiltration attacks in DNS logs. ML model 104 is trained using vector representations 124 and training dataset 122 to detect potentially malicious exfiltration attacks. During the inference phase of trained ML model 104, DNS requests are pre-processed according to techniques described herein to replace hash tokens with the placeholder token. Replacing hash tokens introduces prior knowledge about DNS exfiltration to the machine learning algorithm. Therefore, by replacing hash tokens in input DNS request strings with the same placeholder token as used in the training dataset, this knowledge is introduced to the learning process.

As another example, training dataset 122 is labeled to indicate anomalous DNS requests, and a second ML model 104 is configured to detect anomalous DNS requests. ML model 104 is trained using vector representations 124 and training dataset 122 to detect anomalies. The DNS request semantics encoded in vector representations 124 allows ML model 104 to identify similar DNS requests, which allows for more effective anomaly detection.

Hash replacement allows ML model 104 to detect how the input data should be classified based on semantic similarities with other instances of the placeholder token. Hash replacement during the inference phase of downstream applications further reduces the occurrence of "unseen" tokens that would have resulted without hash replacement, which increases the effectiveness of the downstream applications. For example, "unseen" tokens may be ignored, or character substitution may be attempted to determine whether the unseen token becomes a seen token by replacing, adding, or removing characters in the token, etc. As another example, "unseen" tokens can be processed by using known NLP techniques for "out-of-vocabulary" words, e.g., by breaking the token into its character n-grams as with the fastText ML model. (For additional information regarding the fastText ML model, see Bojanowski, Piotr et al. "Enriching Word Vectors with Subword Information." *Transactions of the Association for Computational Linguistics*, vol. 5, pp. 135-146 (2017), which is incorporated by reference as if fully set forth herein.)

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e., simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e., multidimensional as with several inputs) abstractions needing multiple layers that achieve cascaded processing. Reusable matrix-based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e., completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e., correct) output is already known for each example in a training set. The training set is configured in advance by (e.g., a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g., anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Hardware Overview

Training dataset 122, training dataset 122A, and vector representations 124 may reside in volatile and/or non-volatile storage, including persistent storage 120 or flash memory, or volatile memory of computing device 100. Additionally, or alternatively, such data may be stored, at least in part, in main memory of a database server computing device.

An application, such as encoding application 110, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
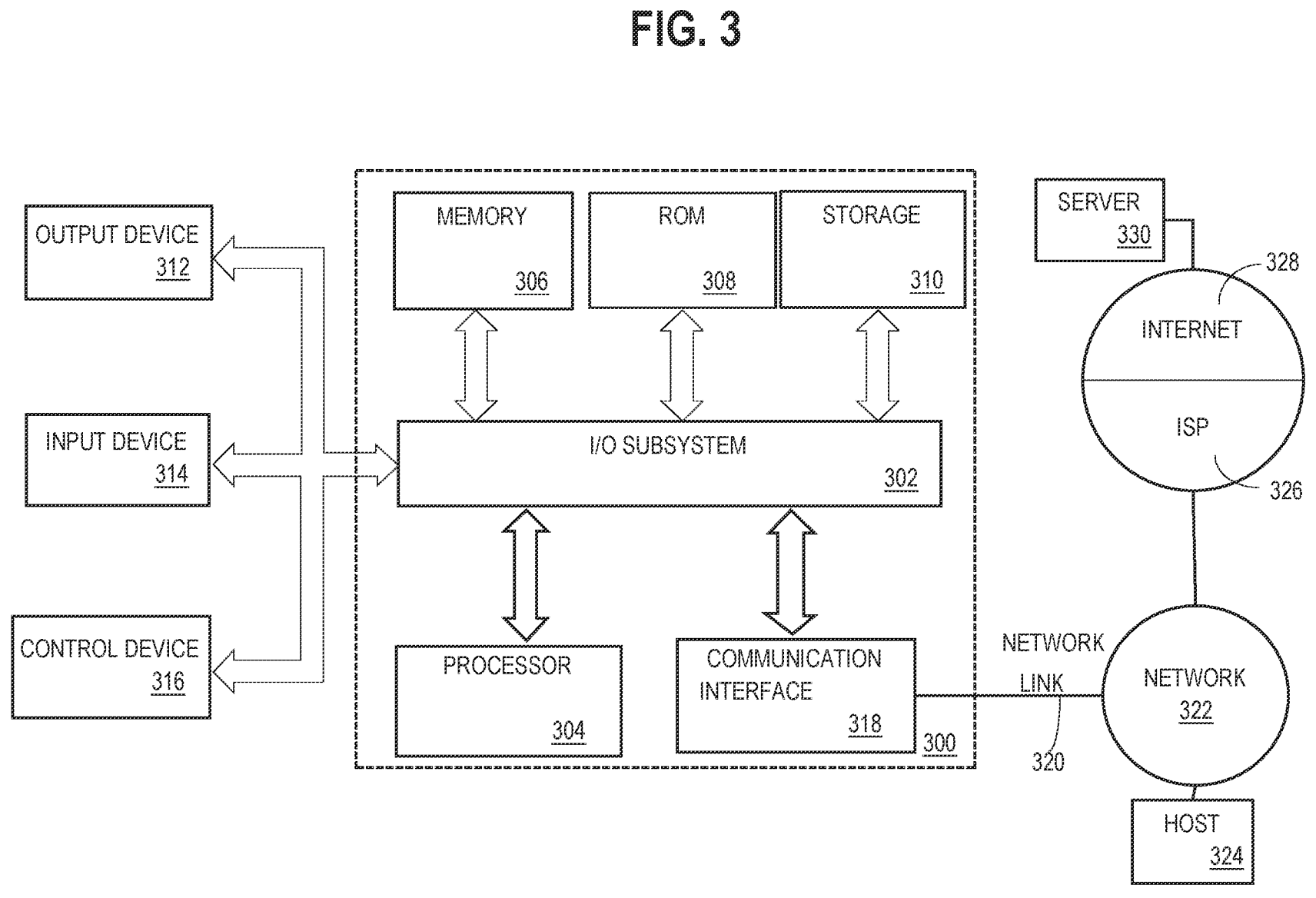

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electro-magnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

Software Overview

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
generating, from an original domain name system (DNS) request string, a plurality of tokens;
generating, from each token in the plurality of tokens, a respective entropy metric in a plurality of entropy metrics of the plurality of tokens;
generating, based on the plurality of entropy metrics of the plurality of tokens, a replacement DNS request string that contains a part of the original DNS request string;
generating a learned inference that is an encoding of the replacement DNS request string; and
generating, based on the encoding of the replacement DNS request string, a learned inference that the original DNS request string is anomalous;
wherein the method is performed by one or more computers.

2. The method of claim 1 wherein said generating the replacement DNS request string comprises generating a second plurality of tokens that contains at least one selected from a group consisting of:
fewer distinct tokens than the plurality of tokens, more duplicate tokens than the plurality of tokens, and a same count of tokens as the plurality of tokens.

3. The method of claim 1 wherein:
the original DNS request string contains a period character;
none of the plurality of tokens represent the period character.

4. The method of claim 1 wherein said generating the entropy metric from a particular token in the plurality of tokens comprises detecting at least one selected from a group consisting of:
a count of characters in the particular token and
a count of distinct characters in the particular token.

5. The method of claim 4 wherein said generating the entropy metric from the particular token comprises generating at least one selected from a group consisting of:
a decrease of the entropy metric from the particular token based on the count of characters in the particular token and
an increase of the entropy metric from the particular token based on the count of distinct characters in the particular token.

6. The method of claim 1 wherein said generating the entropy metric from a particular token in the plurality of tokens comprises applying at least one selected from a group consisting of a logarithm and a multiplication.

7. The method of claim 1 wherein said generating the replacement DNS request string comprises detecting entropy metrics from the plurality of tokens that exceed a predefined threshold.

8. The method of claim 1 wherein said generating the learned inference that is the encoding comprises performing at least one selected from a group consisting of:
activation of a neuron,
summation of multiplicative products based on a respective distinct weight, and
generation of a fixed-size embedding respectively for each token of multiple tokens of the plurality of tokens.

9. The method of claim 1 wherein said generating the replacement DNS request string comprises replacing multiple distinct tokens in the plurality of tokens with respective instances of a single predefined replacement token.

10. The method of claim 1 wherein:
the plurality of tokens does not contain a predefined fixed count of tokens,
the learned inference that is the encoding has a predefined fixed size.

11. One or more computer-readable non-transitory media storing instructions that, when executed by one or more processors, cause:
generating, from an original domain name system (DNS) request string, a plurality of tokens;
generating, from each token in the plurality of tokens, a respective entropy metric in a plurality of entropy metrics of the plurality of tokens;
generating, based on the plurality of entropy metrics of the plurality of tokens, a replacement DNS request string that contains a part of the original DNS request string;
generating a learned inference that is an encoding of the replacement DNS request string; and
generating, based on the encoding of the replacement DNS request string, a learned inference that the original DNS request string is anomalous.

12. The one or more computer-readable non-transitory media of claim 11 wherein said generating the replacement DNS request string comprises generating a second plurality of tokens that contains at least one selected from a group consisting of:

fewer distinct tokens than the plurality of tokens, more duplicate tokens than the plurality of tokens, and a same count of tokens as the plurality of tokens.

13. The one or more computer-readable non-transitory media of claim 11 wherein:

the original DNS request string contains a period character;

none of the plurality of tokens represent the period character.

14. The one or more computer-readable non-transitory media of claim 11 wherein said generating the entropy metric from a particular token in the plurality of tokens comprises detecting at least one selected from a group consisting of:

a count of characters in the particular token and a count of distinct characters in the particular token.

15. The one or more computer-readable non-transitory media of claim 14 wherein said generating the entropy metric from the particular token comprises generating at least one selected from a group consisting of:

a decrease of the entropy metric from the particular token based on the count of characters in the particular token and an increase of the entropy metric from the particular token based on the count of distinct characters in the particular token.

16. The one or more computer-readable non-transitory media of claim 11 wherein said generating the entropy metric from a particular token in the plurality of tokens comprises applying at least one selected from a group consisting of a logarithm and a multiplication.

17. The one or more computer-readable non-transitory media of claim 11 wherein said generating the replacement DNS request string comprises detecting entropy metrics from the plurality of tokens that exceed a predefined threshold.

18. The one or more computer-readable non-transitory media of claim 11 wherein said generating the learned inference that is the encoding comprises performing at least one selected from a group consisting of:

activation of a neuron, summation of multiplicative products based on a respective distinct weight, and generation of a fixed-size embedding respectively for each token of multiple tokens of the plurality of tokens.

19. The one or more computer-readable non-transitory media of claim 11 wherein said generating the replacement DNS request string comprises replacing multiple distinct tokens in the plurality of tokens with respective instances of a single predefined replacement token.

20. The one or more computer-readable non-transitory media of claim 11 wherein:

the plurality of tokens does not contain a predefined fixed count of tokens, the learned inference that is the encoding has a predefined fixed size.

21. The method of claim 1 wherein the replacement DNS request string contains a single predefined replacement token as a replacement of an additional part of the original DNS request string.

* * * * *